July 1, 1952  Z. TAKATS  2,601,911

SPRING TYPE CLUTCH

Filed July 11, 1947

INVENTOR
Zoltan Takats

ATTORNEY

Patented July 1, 1952

2,601,911

UNITED STATES PATENT OFFICE 2,601,911

SPRING TYPE CLUTCH

Zoltan Takats, Vestal, N. Y., assignor to General Aniline & Film Corporation, New York, N. Y., a corporation of Delaware Application July 11, 1947, Serial No. 760,235

2 Claims. (Cl. 192—41)

This application pertains to an invention in photographic apparatus of the type in which film is fed over a sprocket. More specifically, the application pertains to improvements in film feeding devices such as are used in motion picture cameras, magazines, or projectors and wherein the film is advanced by a sprocket which is driven in timed relationship to other elements which function to move the film at a rate synchronized with the movement imparted by the sprocket.

Among the objects of the invention is that of providing for a sprocket a drive which shall be positive in one direction, but which shall also permit the sprocket to overrun, i. e., to run ahead of its driving means in the event of film being required faster than the delivery speed normally provided. Another object of the invention is that of providing in a moving picture camera, magazine, or projector, a sprocket drive which shall function to advance a definite amount of film in synchronism with movement of other parts of the device, but which shall be effective to relieve undue tension in the film in the event the sprocket drive fails to advance enough film or, due to other unintended operation, the synchronism of parts and their relationship to the film is disturbed.

It is a further object to provide a compact, effective, and simple positive drive means for a film engaging sprocket which shall permit the sprocket to overrun its driving means if the film tends to advance faster than it is delivered by the normal action of the sprocket.

Other objects of the invention will become apparent from the following disclosure.

In the various moving picture apparatus such as cameras, projectors, and especially camera magazines, film is drawn from a supply and is advanced through a film gate at which it is exposed after which it is wound on suitable take-up means. In providing for a smooth and properly timed film movement, positive driving mechanism is used to advance the film to and from the film gate, such means usually comprising one or more toothed sprockets engageable with the perforated edge or edges of the film. At the gate itself, the film is intermittently progressed at some predetermined number of frames per unit of time by a claw or other intermittent movement, these being well known to those skilled in the art.

The sprockets driven by the motive power provided in the camera or other motion picture device are rotated at a speed synchronized to that of the intermittent claw movement so that, in theory, exactly the same amount of film will be fed from the supply to the gate and will be taken from the gate and advanced toward the take-up reel as is actually intermittently passed through the gate itself. Normally, the driving means for the sprocket or sprockets and for the claw movement are positively interconnected so that for a given movement of one element each of the other elements has imparted thereto a proportionate and synchronized movement.

Since the claw movement is not continuous while the rotational driving force imparted by the sprockets is continuous, the film is usually drawn out into loops at either side of the gate so that feeding of the film from the supply and its take-up from the gate may be continuous without disturbing the intermittent function at the gate. These loops are very important and must be maintained in order to assure proper action of the film during exposing and in order to make certain that the film is not at any time unduly tensioned thereby to cause it to throw an undue load on the claw movement or otherwise to bring about improper functioning of the various parts. If tension becomes too great, of course, the film may actually be broken. According to the theoretical action for which the parts are designed, there should be little disturbance of the initially formed film loops. It is especially true when using magazines loaded film that the film loop from the supply to the gate may be lost and that the film between the sprocket at that side of the gate and the gate itself may become unduly tensioned. Magazines may be inserted and removed from the camera several times during the exposure of a complete magazine load of film since magazine loaded film is employed with the idea of changing film, e. g., from color to black and white or to different types of each of these films as the occasion requires. Each time the magazine is inserted in the camera, it is necessary to mesh the teeth or projections of a clutch member in the magazine with a similar or cooperating clutch member in the camera. These clutch teeth in some instances are spaced a 6th of a revolution apart so that if they do not align, the insertion of the magazine causes a turning movement of the sprockets which may possibly advance the film toward the gate or may take back film from the initially provided loop at the gate. The film held by the pressure pad at the gate is not moved readily. If the sprockets are rotated reversely, the loop is gradually diminished in size, and if, as frequently happens, two or three repeated removals and insertions of the magazine all happen to cause engagement of the clutch teeth so that film is drawn back from the loop, it becomes unduly tight. In that situation, the functioning of the parts is seriously interfered with and in some instances, the film may bind at the sprocket or the claw action may become so difficult that the camera mechanism is stopped or at least seriously modified so that the exposure and resulting pictures are adversely affected.

To overcome the difficulty above described, the sprocket drive from the supply to the gate has been modified and improved so that it is impossible for the film at that side of the gate to become unduly tensioned. The sprocket is actually driven by a relatively simple and inexpensive but effective unidirectional drive which permits overrunning in the direction of rotation. The invention will be described in detail by reference to the accompanying figures of drawing, wherein identical numerals of reference are applied to like parts in the several views.

Figure 1:
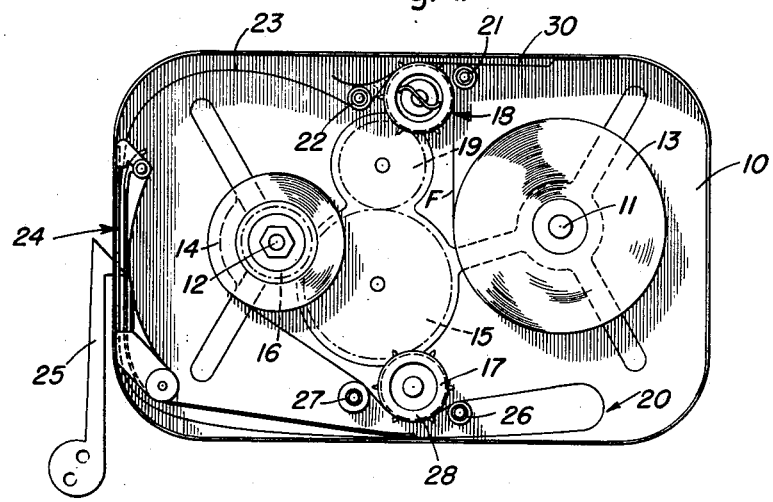
Fig. 1 is an elevation showing a magazine to which the invention has been applied.

Now referring to Fig. 1, a magazine for a moving picture camera is illustrated and has a casing 10 which forms a support for spindles 11 and 12 upon which are rotatably mounted the supply roll of film 13 and a take-up roll 14, respectively. The supply roll 13 is relatively free to be turned, although, as is the common practice, it is frictioned enough to prevent overrunning. The take-up roll 14 is wound on the usual core which is frictionally driven by gearing including the gears 15 and 16, the first mentioned gear being rotated by a pinion behind the take-up sprocket 17 which is directly driven by clutch engagement with the spring motor or other power means in the camera or other photographic apparatus. A sprocket generally indicated by numeral 18 is driven by mechanism hereinafter to be described by reference to Fig. 2 through the gear 14 and a second intermediate gear 19 which meshes with a smaller gear or pinion fixed to a central spindle concentric with the sprocket 18. The film F is withdrawn from the roll 13 and is passed under freely rotatable guide rollers 21 and 22 being threaded over the sprocket 18 between these rollers, and is then formed into a relatively loose loop 23 after which it is threaded downwardly through the gate 24. This gate 24 may be of any convenient construction and need not be described in detail at this time. The film is intermittently moved through the gate in synchronism with the opening and closing movements of a shutter (not shown) by the conventional claw 24 driven in synchronism with the sprockets 17 and 18 and from the same source of motive power.

After exposure at the gate, the film is threaded as shown in Fig. 1, passing over rollers 26 and 27 and being threaded about a portion of the sprocket 28 intermediate these rollers. It then passes to the take-up reel 14 to be wound thereon in a manner known in the art. The film at the take-up side is formed into a loop 20 prior to being turned back and threaded about the sprocket 17.

As before described, repeated removal and reinsertion of the magazine in the camera sometimes causes reverse rotation of the sprockets and while that merely enlarges the loop 20 at the take-up side, the opposite effect that is a tightening of the loop 23 is in evidence at the supply side. As can be seen, if two or three such reinsertions of the magazine all happen to result in reverse rotation of the sprockets, the loop 23 may become lost entirely so that the film from the sprocket 18 to the gate becomes relatively tight or tensioned. Since the claw 25 will not permit film to be drawn backwardly, and in fact, will when the camera is in operation continue to draw film as long as it can, the tendency is to continue operation without the loop 23 and under conditions which throw an excessive load on the claw 25, seriously tensioning the film and also tending to bind it or to jam it at the sprocket 18. The film is guided about and is maintained in contact with the teeth of the sprocket by means of a spring 30 fixed to the top wall of the magazine and being curved to follow the contour of the sprocket and rest upon roller 22 all as illustrated in Fig. 1. That spring 30 is preferably slotted so that the teeth project through the slots. That construction makes it virtually impossible for the film to jump from one tooth to another on the sprocket or to become disengaged from the sprocket. In some instances, the spring may merely bear upon the tops of the sprocket teeth, and in any event, the spring must have sufficient flexibility to permit it to be pressed away from the sprocket when the film is threaded.

Figure 2:
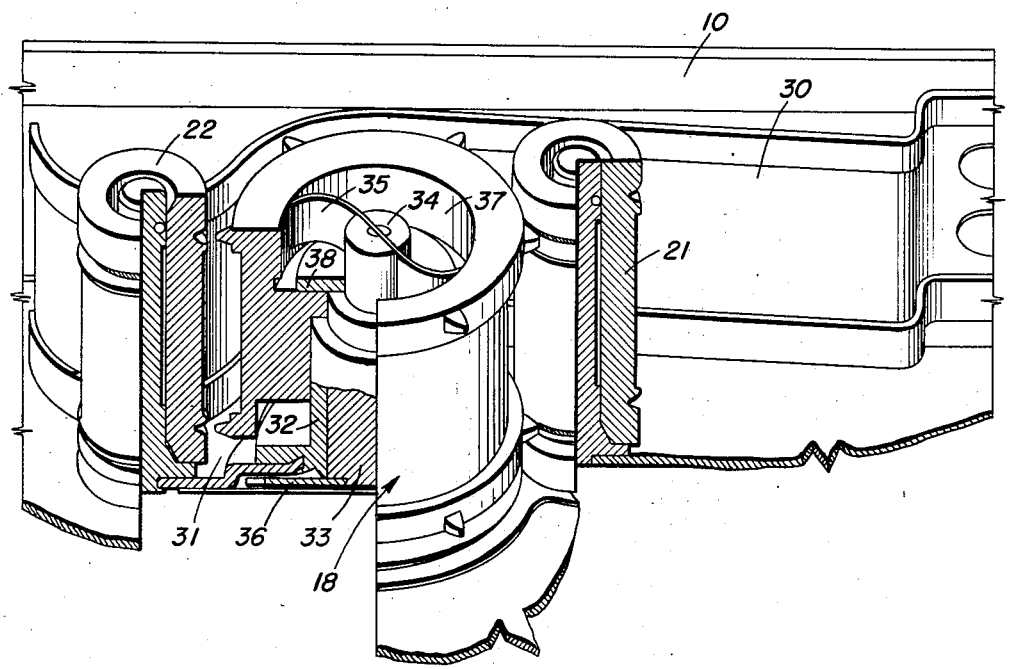
Fig. 2 is a perspective view, certain parts being broken away to be shown in section, illustrating the details of the uni-directional overrunning sprocket drive.

To obviate the difficulties attendant upon the loss of the loop 23, the sprocket 18 is driven as illustrated in Fig. 2 by a uni-directional overrunning drive. The parts at the sprocket are illustrated in Fig. 2 at a very much enlarged scale and details not evidenced in Fig. 1 are clearly visible in this second figure.

The back wall of the casing 10, designated by numeral 31 is bent upwardly, or otherwise formed so as to support or retain in position a central sleeve 32 within which is rotatively guided a spindle 33 having an end 34 within which is held an S-shaped drive spring 35. The spindle has fixed at its other end a gear 36 having teeth meshing with the teeth on the intermediate gear 19, Fig. 1.

The sprocket 18 has one end (the top end, Fig. 2) counterbored to form an internal cylindrical surface 37 engaged by the spring member 35. The sprocket is held in position by engagement of certain shoulders on the parts and by a washer 38 engaged beneath drive spring 35 which is fixed in the end of the spindle. When the spindle 33 is rotated in a counterclockwise direction for advancing the film toward the gate, the effect of the engagement between the S-shaped spring 35 and the internal surface 37 of the sprocket is one which results in driving the sprocket at the same rate as the spindle. The parts, however, may overrun if there is any tendency for the sprocket to be rotated faster than it is positively driven. As above explained, that provides for the contingency under which there is a tendency to draw film from the supply faster than it is fed thereby to tighten the loop 23 until the film is seriously strained and caused to create undue pressure at the top of the gate.

In operation the magazine is inserted in a proper camera mechanism thereby engaging the driving clutch for the sprocket 17 with a cooperating clutch member in the camera. The claw 25 is also engaged with the film at the gate. Upon starting the camera, the film is drawn from the supply 13 and is positively fed to the gate and taken from the gate by the sprockets 17 and 18. The film fed by sprocket 17 is taken up at the reel 14 in a known manner. Sometimes, it is found desirable to remove one magazine and substitute another. That may be done several times so that any particular magazine may be removed and reinserted in the camera several times before the total amount of film therein has been exposed. If, due to failure of the clutch to mesh properly, the sprockets are rotated without moving the film through the gate so that the loop 23 is lost, the mechanism herein described prevents any undue tensioning of the film between the sprocket 18 and the gate since that sprocket may be rotated in the direction of film advance and film drawn from the supply without subjecting it to any abnormal tension whatsoever. Sometimes users of magazine loaded film may rotate the clutch without realizing the effect thereof upon the film and mechanism within the magazine casing. In that event, it is possible to advance the film, but if subjected to reverse rotation, the loop 23 cannot be lost since the member 35 within the sprocket will not rotate it in a reverse direction.

While one embodiment of the invention has been disclosed, it is to be understood that the inventive concept may be carried out in a number of ways. This application is, therefore, not to be limited to the precise details described, but is intended to cover all variations and modifications thereof falling within the spirit of the invention and the scope of the claims.

I claim:

1. An overrunning drive mechanism for sprocket feeds comprising a sleeve, a sprocket rotatable thereon having a counter-sunk recessed portion, said recessed portion having a smooth continuous surface, a driving spindle rotatable within said sleeve and extending into said recessed portion, said spindle having a diagonal groove, a flat spring pressed in said groove, the edge of said spring being perpendicular to said spindle, said spring having an end portion forming an acute angle with the inner surface of the recessed portion and its end engaging said surface whereby rotation of said spindle in one direction exerts driving force on said sprocket and in the other direction permits displacement of said spring over the inner surface of the recessed portion of said sprocket.

2. A simple uni-directional drive coupling adapted for quick assembly comprising a driven member having a concentric clyindrical recessed portion, said recessed portion having a smooth continuous surface, a drive spindle having a diagonal slotted end extending into said recessed portion, a flat spring inserted into said slotted end extending radially from said spindle and being of a length slightly greater than the inner diameter of said recessed portion, said spring having an end portion forming an acute angle with the inner surface of the recessed portion and its end engaging said surface, whereby rotation of said spindle in one direction exerts driving force on said sprocket and in the other direction permits displacement of said spring over the inner surface of the recessed portion of said sprocket.

ZOLTAN TAKATS.

REFERENCES CITED

The following references are of record in the file of this patent:

UNITED STATES PATENTS

| Number | Name | Date |
|---|---|---|
| 960,794 | Bingham | June 7, 1910 |
| 1,005,936 | Cameron | Oct. 17, 1911 |
| 1,468,322 | Odom | Sept. 18, 1923 |
| 1,839,064 | Thornton | Dec. 29, 1931 |

FOREIGN PATENTS

| Number | Country | Date |
|---|---|---|
| 284,366 | Germany | May 22, 1915 |
| 678,117 | France | Dec. 23, 1929 |
| 344,344 | England | Mar. 2, 1931 |